United States Patent
Hsu

(10) Patent No.: US 9,450,765 B2
(45) Date of Patent: Sep. 20, 2016

(54) SYSTEM AND METHOD CAPABLE OF VERIFYING CONTACTLESS SENSOR TAG

(71) Applicant: Yi-Hong Hsu, New Taipei (TW)

(72) Inventor: Yi-Hong Hsu, New Taipei (TW)

(73) Assignee: Yi-Hong Hsu, New Taipei (TW)

( * ) Notice: Subject to any disclaimer, the term of this patent is extended or adjusted under 35 U.S.C. 154(b) by 72 days.

(21) Appl. No.: 14/468,083

(22) Filed: Aug. 25, 2014

(65) Prior Publication Data

US 2015/0067332 A1    Mar. 5, 2015

(30) Foreign Application Priority Data

Aug. 29, 2013  (TW) .............................. 102131146 A

(51) Int. Cl.
*H04L 9/00* (2006.01)
*H04L 9/32* (2006.01)

(52) U.S. Cl.
CPC ........... *H04L 9/3271* (2013.01); *H04L 9/3226* (2013.01); *H04L 9/3297* (2013.01); *H04L 2209/805* (2013.01)

(58) Field of Classification Search
CPC ........... H04L 9/3226; H04L 2209/805; H04L 9/3297; H04L 9/3271
USPC ....................................................... 713/168
See application file for complete search history.

(56) References Cited

U.S. PATENT DOCUMENTS

| | | |
|---|---|---|
| 2005/0071231 A1 | 3/2005 | Beenau et al. |
| 2008/0079535 A1* | 4/2008 | Tseng ...................... G06F 21/33 340/5.8 |
| 2008/0079540 A1* | 4/2008 | Aull ...................... G06K 7/0008 340/10.1 |

FOREIGN PATENT DOCUMENTS

| | | |
|---|---|---|
| TW | I325566 | 9/1995 |
| TW | I384405 | 9/1997 |
| TW | I325566 | 6/2010 |
| TW | I384405 | 2/2013 |

* cited by examiner

*Primary Examiner* — Baotran N To
(74) *Attorney, Agent, or Firm* — Tracy M. Heims; Apex Juris, PLLC.

(57) ABSTRACT

A system and a method capable of verifying contactless sensor tag, the system comprising: a reading device, served to generate a first verification code according to a first dynamic value and generate an authority request according to an authority code; a sensor tag, used to obtain the first verification code of the reading device in a contactless way, generate a second verification code according to a second dynamic value, and process a ciphering calculation according to an identification code, the first verification code and the second verification code for generating the authority code, and send the authority code to the reading device in a contactless way; and a verifying device, used to receive the authority request of the reading device, and perform a deciphering calculation on the authority request for obtaining the first dynamic value and the second dynamic value for determining whether the sensor tag is real.

12 Claims, 2 Drawing Sheets

SYSTEM AND METHOD CAPABLE OF VERIFYING CONTACTLESS SENSOR TAG

BACKGROUND OF THE INVENTION

1. Field of the Invention

The present invention relates to a system and a method capable of verifying a contactless sensor tag.

2. Description of Related Art

A contactless sensor tag is defined as an electronic device able to identify or read data through radio signals and a reading system can access the sensor tag without any mechanical contact or optical communication. Thus, the communication between the two can be established through radio signals. Such a system is employed by, for example: an EAZY card (used in Taipei Metro Transportation System in Taiwan), a sense-type credit card, a security door locking buckle or a NFC mobile phone utilizes radio frequency identification (RFID) or near field communication (NFC) for exchanging data, thereby being provided with convenience. However, the identification code of a conventional sensor tag is fixed data or remains the same after being ciphered, so the data is very likely to be logged or deciphered and no security is provided.

Taiwan Patent No. 1384405 has disclosed a verification method, in which a reading device is served to send a first verification code to a responding device, and a signal responded by the responding device is analyzed for obtaining the first verification code which is compared with a second verification code generated by the reading device during receiving. Because the first verification code and the second verification code are relevant dynamic values, an anti-faking effect is provided. However, the responding device and the reading device adopted in the conventional verification method are easy to get, so the devices are vulnerable to being counterfeited or deciphered, and there for contraindicated for high security level applications such as financial transactions.

In addition, U.S. Patent Publication No. 20050071231 has disclosed a system including an authorizing entity, the system utilizes a sensor tag to generate a random number and utilizes a database to provide a verification code relevant to the random number, and the authorizing entity verifies whether the sensor tag is real through examining the relevance between the random number and the verification code. Moreover, the Taiwan Patent No. 1325566 has disclosed an improved verification method, in which a variable secret key is adopted to replace the mentioned database for providing the random number and the verification code thereby increasing the difficulty of deciphering. The two mentioned verification systems both utilize a verifying device, instead of the reading device, for the purpose of verification, but the verifying device trusts the reading device and only processes the verification according the data conflict; if someone intentionally logs the verification data and counterfeits a reading device for sending the verification request, the mentioned verification system is unable to identify the invasion.

In view of the above-mentioned disadvantages, the need for a more reliable verification mechanism for contactless sensor tag persists.

SUMMARY OF THE INVENTION

One primary objective of the present invention is to provide a system and a method capable of verifying a contactless sensor tag capable of enhancing the reliability and capability of verifying.

Another objective of the present invention is to provide a system and a method capable of verifying a contactless sensor tag capable of verifying whether a sensor tag and a reading device being real or fake at the same time, thereby enhancing the reliability of verifying.

For achieving aforesaid objectives, the present invention provides a system capable of verifying a contactless sensor tag, which comprises:

a reading device, served to generate a first verification code according to a first dynamic value and generate an authority request according to an authority code;

a sensor tag, used to obtain the first verification code of the reading device in a contactless way, and served to generate a second verification code according to a second dynamic value, and process a ciphering calculation according to an identification code, the first verification code and the second verification code for generating the authority code, and send the authority code to the reading device in a contactless way; and a verifying device, used to receive the authority request of the reading device, and served to process a deciphering calculation to the authority request for obtaining the first dynamic value and the second dynamic value, process a first comparing calculation to the first dynamic value and a third dynamic value for generating a first difference value, process a second comparing calculation to the second dynamic value and a fourth dynamic value for generating a second difference value, and determine whether the reading device is real according to the first difference value and determine whether the sensor tag is real according to the second difference value, wherein the deciphering calculation is corresponding to the ciphering calculation.

According to one embodiment of the present invention, the reading device includes a first dynamic value generator which generates the first dynamic value according to a first operator mode, and a first verification code generator which generates the first verification code according to a first cipher mode; the sensor tag includes a second dynamic value generator which generates the second dynamic value according to a second operator mode, and a second verification code generator which generates the second verification code according to a second cipher mode; and the verifying device includes a third dynamic value generator which generates the third dynamic value according to the first operator mode, and a fourth dynamic value generator which generates the fourth dynamic value according to the second operator mode.

According to one embodiment of the present invention, the first operator mode and the second operator mode are selected from a group consisted of a time stamp mode, a counting mode and an authentication password mode.

According to one embodiment of the present invention, the first cipher mode and the second cipher mode are selected from a group consisted of a predetermined formula mode and a table checking mode.

According to one embodiment of the present invention, the ciphering calculation utilizes the identification code, the first verification code and the second verification code as a resource operand, and the content of destination operand is the authority code; and the deciphering calculation utilizes the authority code as a resource operand, and the content of destination operand is the identification code, the first verification code and the second verification code.

According to one embodiment of the present invention, the contactless way is a radio frequency (RF) communication way.

For achieving aforesaid objectives, the present invention provides a method capable of verifying a contactless sensor tag, which includes the steps of:

a first step: a reading device generates a first verification code according to a first dynamic value and generates an authority request according to an authority code;

a second step: a sensor tag receives the first verification code of the reading device in a contactless way, and the senor tag generates a second verification code according to a second dynamic value, processes a ciphering calculation according to an identification code, the first verification code and the second verification code for generating the authority code, and sends the authority code to the reading device in a contactless way;

a third step: a verifying device receives the authority request of the reading device, and the verifying device processes a deciphering calculation to the authority request for obtaining the first dynamic value and the second dynamic value, processes a first comparing calculation to the first dynamic value and a third dynamic value for generating a first difference value, processes a second comparing calculation to the second dynamic value and a fourth dynamic value for generating a second difference value, and determines whether the reading device is real according to the first difference value and determines whether the sensor tag is real according to the second difference value, wherein the deciphering calculation is corresponding to the ciphering calculation; and a fourth step: the verifying device determines whether the identification code is real or fake through determining whether the reading device and the sensor tag being real or fake.

According to one embodiment of the present invention, the reading device includes a first dynamic value generator which generates the first dynamic value according to a first operator mode, and a first verification code generator which generates the first verification code according to a first cipher mode; the sensor tag includes a second dynamic value generator which generates the second dynamic value according to a second operator mode, and a second verification code generator which generates the second verification code according to a second cipher mode; and the verifying device includes a third dynamic value generator which generates the third dynamic value according to the first operator mode, and a fourth dynamic value generator which generates the fourth dynamic value according to the second operator mode.

According to one embodiment of the present invention, the first operator mode and the second operator mode are selected from a group consisted of a time stamp mode, a counting mode and an authentication password mode.

According to one embodiment of the present invention, the first cipher mode and the second cipher mode are selected from a group consisted of a predetermined formula mode and a table checking mode.

According to one embodiment of the present invention, the ciphering calculation utilizes the identification code, the first verification code and the second verification code as a resource operand, and the content of destination operand is the authority code; and the deciphering calculation utilizes the authority code as a resource operand, and the content of destination operand is the identification code, the first verification code and the second verification code.

According to one embodiment of the present invention, the contactless way is a radio frequency (RF) communication way.

BRIEF DESCRIPTION OF THE DRAWINGS

The present invention will be apparent to those skilled in the art by reading the following detailed description of a preferred embodiment thereof, with reference to the attached drawings, in which.

DETAILED DESCRIPTION OF THE PREFERRED EMBODIMENT

Figure 1:
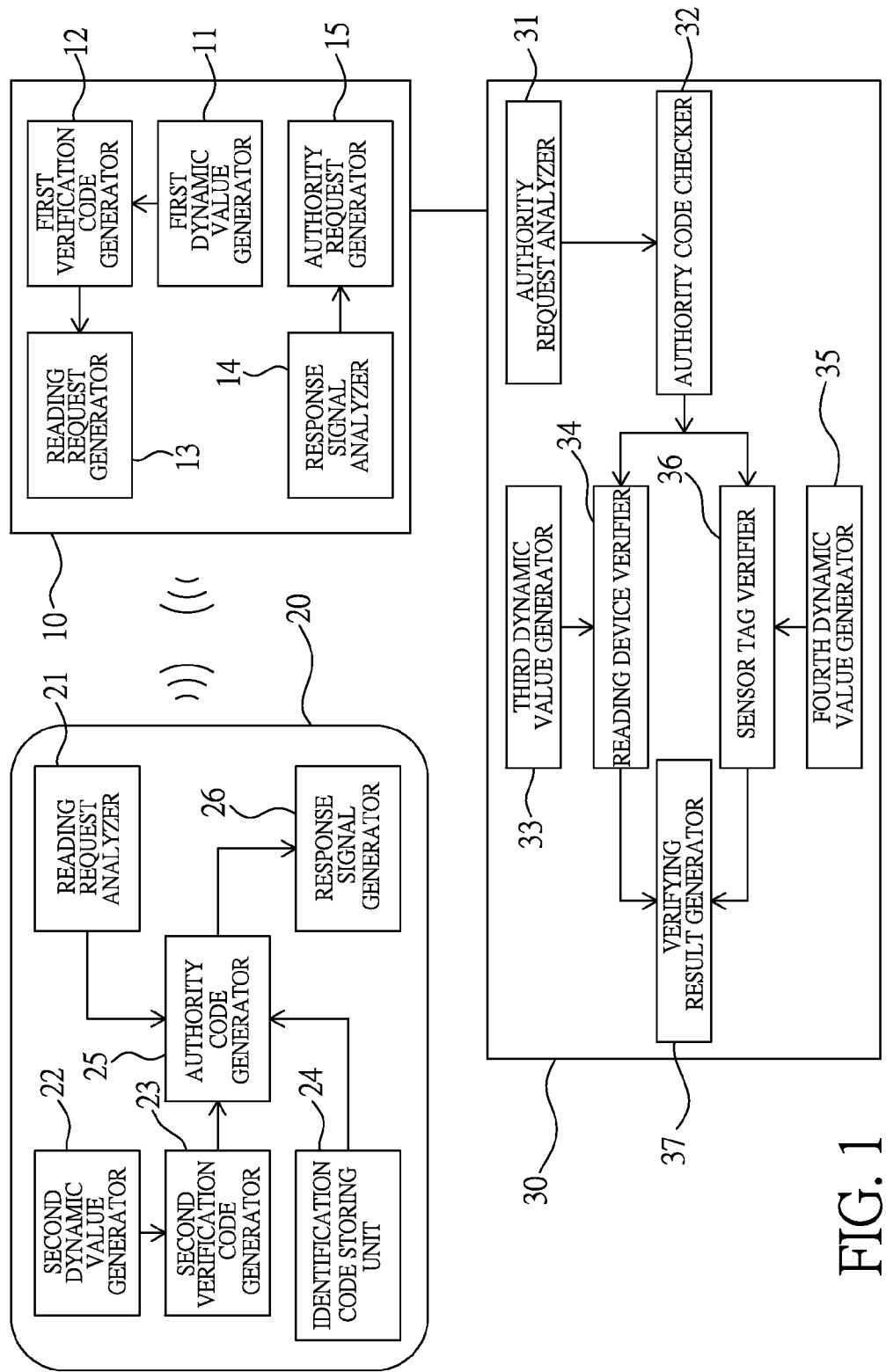
FIG. 1 is a block view illustrating the system capable of verifying a contactless sensor tag according to one embodiment of the present invention.

Referring to FIG. 1, which is a block view illustrating the system capable of verifying a contactless sensor tag according to one embodiment of the present invention. As shown in FIG. 1, the system includes a reading device 10, a sensor tag 20 and a verifying device 30.

The reading device 10 is served to generate a first verification code according to a first dynamic value and generate an authority request according to an authority code. The reading device 10 includes a first dynamic value generator 11, a first verification code generator 12, a reading request generator 13, a response signal analyzer 14 and an authority request generator 15.

The first dynamic value generator 11 is served to generate the first dynamic value according to a first operator mode, and the first operator mode is selected from a group consisted of a time stamp mode and a counting mode. The time stamp mode is served to generate the first dynamic value according to the current time of a clock; the counting mode is served to generate the first dynamic value according to the current counting value of a counter.

The first verification code generator 12 is served to process the first dynamic value according to a first cipher mode for generating the first verification code, and the first cipher mode is selected from a group consisted of a predetermined formula mode and a table checking mode, thereby allowing the first verification code to be provided with reversibility.

The reading request generator 13 is served to generate a reading request containing the first verification code according to a predetermined coding standard, thereby enabling the reading request to be sent by the reading device 10 to the sensor tag 20.

The response signal analyzer 14 is served to analyze a response signal sent by the sensor tag 20 according to the predetermined coding standard for obtaining the authority code.

The authority request generator 15 is served to generate the authority request containing the authority code according to a predetermined communication protocol, thereby enabling the authority request to be sent by the reading device 10 to the verifying device 30.

The sensor tag 20 is used to obtain the first verification code of the reading device 10 in a contactless way, and the sensor tag 20 is served to generate a second verification code according to a second dynamic value, and to process a ciphering calculation according to an identification code, the first verification code and the second verification code for generating the authority code, and convert the authority code into the response signal for being sent to the reading device 10 in a contactless way, wherein the contactless way is a radio frequency (RF) communication way. The sensor tag 20 includes a reading request analyzer 21, a second dynamic value generator 22, a second verification code generator 23, an identification code storing unit 24, an authority code generator 25 and a response signal generator 26.

The reading request analyzer 21 is served to analyze the reading request sent by the reading device 10 according to the predetermined coding standard for obtaining the first verification code.

The second dynamic value generator 22 is served to generate the second dynamic value according to a second operator mode, and the second operator mode is selected from a group consisted of a time stamp mode and a counting mode. The second operator mode and the first operator mode are independent to each other, in other words the two can be the same or different.

The second verification code generator 23 is served to generate the second verification code according to the second dynamic value and a second cipher mode, and the second cipher mode is selected from a group consisted of a predetermined formula mode and a table checking mode, thereby allowing the second verification code to be provided with reversibility. The second cipher mode and the first cipher mode are independent to each other, in other words the two can be the same or different.

The authority code generator 25 is served to process a ciphering calculation according to an identification code stored in the identification code storing unit 24, the first verification code and the second verification code for generating the authority code, wherein the identification code is served to represent the identification related data of the sensor tag 20, and the ciphering calculation utilizes the identification code, the first verification code and the second verification code as a resource operand, and the content of destination operand is the authority code.

The response signal generator 26 is served to generate the response signal containing the authority code according to the predetermined coding standard.

The verifying device 30 is used to receive the authority request of the reading device 10, and the verifying device 30 is served to process a deciphering calculation to the authority request for obtaining the identification code, the first dynamic value and the second dynamic value, process a first comparing calculation to the first dynamic value and a third dynamic value for generating a first difference value, process a second comparing calculation to the second dynamic value and a fourth dynamic value for generating a second difference value, and determine whether the reading device 10 is real according to the first difference value and determine whether the sensor tag 20 is real according to the second difference value; wherein the deciphering calculation is corresponding to the ciphering calculation, and the deciphering calculation utilizes the authority code as a resource operand, and the content of destination operand is the identification code, the first verification code and the second verification code. The verifying device 30 includes an authority request analyzer 31, an authority code checker 32, a third dynamic value generator 33, a reading device verifier 34, a fourth dynamic value generator 35, a sensor tag verifier 36 and a verifying result generator 37.

The authority request analyzer 31 is served to analyze the authority request sent by the reading device 10 according to the predetermined communication protocol for obtaining the authority code.

The authority code checker 32 is served to process the deciphering calculation according to the authority code for obtaining the identification code, the first verification code and the second verification code.

The third dynamic value generator 33 is served to generate the third dynamic value according to the first operator mode.

The reading device verifier 34 is used to obtain the first dynamic value according to the first cipher mode and the first verification code, and the reading device verifier 34 is served to process the first comparing calculation to the third dynamic value and the first dynamic value for generating the first difference value, and determine whether the reading device 10 is real through determining whether the first difference value being within a first predetermined range.

The fourth dynamic value generator 35 is served to generate the fourth dynamic value according to the second operator mode.

The sensor tag verifier 36 is used to obtain the second dynamic value according to the second cipher mode and the second verification code, and the sensor tag verifier 36 is served to process the second comparing calculation to the fourth dynamic value and the second dynamic value for generating the second difference value, and determine whether the sensor tag 20 is real through determining whether the second difference value being within a second predetermined range.

The verifying result generator 37 is served to generate a final determination of the sensor tag 20 being real or fake according to the determining result of the reading device verifier 34 and the sensor tag verifier 36.

In addition, the system capable of verifying a contactless sensor tag provided by the present invention can also adopt an authentication password mode for generating the first dynamic value, the second dynamic value, the third dynamic value and the fourth dynamic value. In the authentication password mode, the verifying device 30 is served to generate a first dynamic authentication password data and a second dynamic authentication password data, the two are independent to each other, in other words the two can be the same or different, wherein the first dynamic authentication password data is defined as the third dynamic value, the second dynamic authentication password data is defined as the fourth dynamic value. The verifying device 30 is able to send the first dynamic authentication password data and the second dynamic authentication password data to the reading device 10. The reading device 10 uses the first dynamic authentication password data to be served as the first dynamic value and the second dynamic authentication password data to be sent to the sensor tag 20. The second tag 20 uses the second dynamic authentication password data to be served as the second dynamic value. The subsequent verification process is the same as what has been disclosed, therefore no further illustration is provided.

According to the theory disclosed above, the present invention further provides a method capable of verifying a contactless sensor tag, which includes the steps of:

a first step: a reading device generates a first verification code according to a first dynamic value and generates an authority request according to an authority code;

a second step: a sensor tag receives the first verification code of the reading device in a contactless way, and the senor tag generates a second verification code according to a second dynamic value, processes a ciphering calculation according to an identification code, the first verification code and the second verification code for generating the authority code, and sends the authority code to the reading device in a contactless way;

a third step: a verifying device receives the authority request of the reading device, and the verifying device processes a deciphering calculation to the authority request for obtaining the first dynamic value and the second dynamic value, processes a first comparing calculation to the first dynamic value and a third dynamic value for generating a first difference value, processes a second comparing calculation to the second dynamic value and a fourth dynamic value for generating a second difference value, and determines whether the reading device is real according to the first difference value and determines whether the sensor tag is real according to the second difference value, wherein the deciphering calculation is corresponding to the ciphering calculation; and a fourth step: the verifying device determines whether the identification code is real or fake through determining whether the reading device and the sensor tag being real or fake.

Wherein, the reading device includes a first dynamic value generator which generates the first dynamic value according to a first operator mode, a first verification code generator which generates the first verification code according to a first cipher mode; the sensor tag includes a second dynamic value generator which generates the second dynamic value according to a second operator mode, a second verification code generator which generates the second verification code according to a second cipher mode; and the verifying device includes a third dynamic value generator which generates the third dynamic value according to the first operator mode and a fourth dynamic value generator which generates the fourth dynamic value according to the second operator mode.

Wherein, the first operator mode and the second operator mode are selected from a group consisted of a time stamp mode, a counting mode and an authentication password mode.

Wherein, the first cipher mode and the second cipher mode are selected from a group consisted of a predetermined formula mode and a table checking mode.

Wherein, the ciphering calculation utilizes the identification code, the first verification code and the second verification code as a resource operand, and the content of destination operand is the authority code; and the deciphering calculation utilizes the authority code as a resource operand, and the content of destination operand is the identification code, the first verification code and the second verification code.

Wherein, the contactless way is a radio frequency (RF) communication way.

Figure 2:
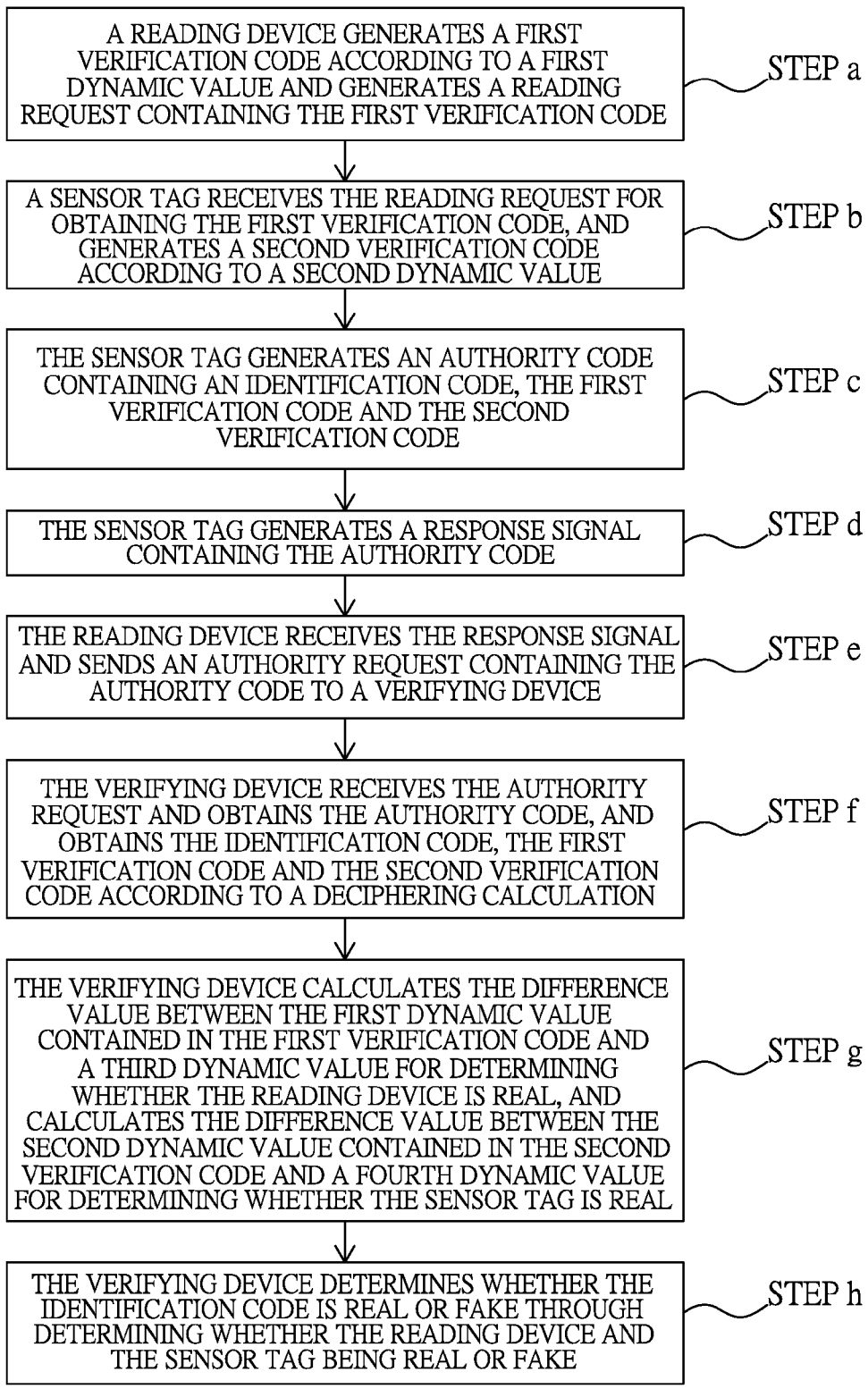
FIG. 2 is a flowchart illustrating the method capable of verifying a contactless sensor tag according to one embodiment of the present invention.

Referring to FIG. 2, which is a flowchart illustrating the method capable of verifying a contactless sensor tag according to one embodiment of the present invention. The steps are illustrated with FIG. 1 and disclosed as followings; what shall be stressed is that the Chinese characters chosen to be disclosed hereinafter are provided for illustrating the variation coding way under ISO/IEC 14443, the scope of the present invention is not limited the provided Chinese characters.

A step a: a reading device generates a first verification code according to a first dynamic value and generates a reading request containing the first verification code. For example: when the reading device 10 sends a reading request, if the first dynamic value generator 11 utilizes a counting mode as the first operator mode, the current counting value "123" generated during the request is defined as the first dynamic value, if the first verification code generator 12 utilizes a table checking mode as the first cipher mode, the first verification code generator 12 is able to read a table according to the indicated location "123" for generating a first verification code "ABC", then the reading request generator 13 generates a reading request containing the "ABC" according to the predetermined coding standard (e.g. ISO/IEC 14443).

A step b: a sensor tag receives the reading request for obtaining the first verification code, and generates a second verification code according to a second dynamic value. For example: the reading request analyzer 21 of sensor tag 20 analyzes the first verification code "ABC" from the received reading request and according to the coding standard (ISO/IEC 14443), if the second dynamic value generator 22 utilizes a time stamp mode as the second operator mode, a current value "201307041259" generated during the response is defined as the second dynamic value, if the second verification code generator 23 utilizes a predetermined formula mode as the second cipher mode, the second verification code generator 23 generates a second verification code "952140703102" according to the predetermined formula mode and the second dynamic value.

A step c: the sensor tag generates an authority code containing an identification code, the first verification code and the second verification code. For example: an identification code "甲乙丙" is stored in the identification code storing unit 24 of the sensor tag 20, and the authority code generator 25 generates an authority code "ABC952140703102A甲952140B乙703102C丙", so the ciphering calculation utilizes the first English letters "ABC" as the first verification code, the front numbers "952140703102" as the second verification code, and the rest English letters, numbers and Chinese characters "A甲952140B乙703102C丙" are defined as the cipher texts containing the identification code, the first verification code and the second verification code are defined as the secret keys, and the identification code "甲乙丙" are defined as plain texts. Another example: another ciphering calculation is processed for generating an authority code "ABC952140703102甲乙丙abcxyz", the first English letters are defined as the first verification code, the front numbers "952140703102" are defined as the second verification code, the front Chinese characters "甲乙丙" are defined as the identification code, and the rest English letters "abcxyz" are defined as the mixed value of the first verification code, the second verification code and the identification code for ensuring the accuracy of the authority code.

A step d: the sensor tag generates a response signal containing the authority code. For example: the response signal generator 26 of the sensor tag 20 generates a response signal containing the authority code "ABC952140703102A甲952140B乙703102C丙" or the authority code "ABC952140703102甲乙丙abcxyz" according to the coding standard (ISO/IEC 14443).

A step e: the reading device receives the response signal and sends an authority request containing the authority code to a verifying device. For example: the response signal analyzer 14 of the reading device 10 analyzes the authority code contained in the response signal according to the coding standard (ISO/IEC 14443), and the authority request generator 15 generates an authority request containing the authority code "ABC952140703102甲952140B乙703102C丙" or the authority code "ABC952140703102甲乙丙abcxyz" according to the predetermined communication protocol (e.g. HTTPS or UART), then a network connection or an electrical connection is provided for sending to the verifying device 30.

A step f: the verifying device receives the authority request and obtains the authority code, and obtains the identification code, the first verification code and the second verification code according to a deciphering calculation. For example: the authority request analyzer 31 of the verifying device 30 obtains the authority code "ABC952140703102A 甲 952140B 乙 703102C 丙 " contained in the authority request according to the communication protocol (e.g. HTTPS or UART), the authority code checker 32 utilizes the deciphering calculation and allows the first English letters "ABC" to be defined as the first verification code, the front numbers "952140703102" as the second verification code, the rest English letters, numbers and Chinese characters "A 甲 952140B 乙 703102C 丙 " are defined as the cipher texts containing the identification code, the first verification code and the second verification code are defined as the secret keys, and the identification code "甲乙丙 " are defined as plain texts.

Another example: another deciphering calculation is processed for generating an authority code "ABC952140703102 甲乙丙 abcxyz", the first English letters "ABC" are defined as the first verification code, the front numbers "952140703102" are defined as the second verification code, the front Chinese characters "甲乙丙 " are defined as the identification code, and the mixed value of the first verification code, the second verification code and the identification code is compared for determining whether being the rest English letters "abcxyz" thereby ensuring the accuracy of the ciphered data.

A step g: the verifying device calculates the difference value between the first dynamic value contained in the first verification code and a third dynamic value for determining whether the reading device is real, and calculates the difference value between the second dynamic value contained in the second verification code and a fourth dynamic value for determining whether the sensor tag is real. For example: the reading device verifier 34 of the verifying device 30 verifies whether the reading device 10 is real, at this moment the counting value generated by the third dynamic value generator 33 according to the first operator mode, i.e. the first dynamic value "108" which has been successfully verified, is defined as the third dynamic value. The reading device verifier 34 obtains the first dynamic value "123" by table checking through the first verification code "ABC" and according to the first cipher mode, and the first difference value (=123−108=15) is obtained through the first dynamic value deducting the third dynamic value and according to the first comparing calculation. In this example, it is set that the reading device 10 is determined as real when the first difference value is positive. As such, the reading device 10 is real because the first difference value is 15.

The sensor tag verifier 36 of the verifying device 30 verifies whether the sensor tag 20 is real, whereupon the time stamp generated by the fourth dynamic value generator 35 according to the second operator mode, i.e., the current value "201307041302", is defined as the fourth dynamic value. With the second cipher mode, the sensor tag verifier 36 obtains the second dynamic value "201307041259" through the second verification code "952140703102" according to the predetermined formula mode, and the second difference value (=3) is obtained through the fourth dynamic value deducting the second dynamic value and according to the second comparing calculation. In this example, it is set that the sensor tag 20 is determined as real when the second difference value is greater than or equal to 0 and smaller than 5 (5 minutes). As such, the sensor tag 20 is real because the second difference value is 3.

A step h: the verifying device determines whether the identification code is real or fake through determining whether the reading device and the sensor tag being real or fake. For example: when the reading device verifier 34 verifies the reading device 10 is real, and the sensor tag verifier 36 verifies the sensor tag 20 is real, the verifying result generator 37 determines the identification code "甲乙丙 " read in the sensor tag 20 is real.

In addition, the method capable of verifying a contactless sensor tag provided by the present invention can also adopts an authentication password mode for generating the first dynamic value, the second dynamic value, the third dynamic value and the fourth dynamic value. In the authentication password mode, the verifying device 30 is served to generate a first dynamic authentication password data and a second dynamic authentication password data, the two are independent to each other, in other words the two can be the same or different, wherein the first dynamic authentication password data is defined as the third dynamic value, the second dynamic authentication password data is defined as the fourth dynamic value. The verifying device 30 is able to send the first dynamic authentication password data and the second dynamic authentication password data to the reading device 10. The reading device 10 uses the first dynamic authentication password data to be served as the first dynamic value and the second dynamic authentication password data to be sent to the sensor tag 20. The sensor tag 20 uses the second dynamic authentication password data to be served as the second dynamic value. The subsequent verification process is the same as what has been disclosed, therefore no further illustration is provided.

Many modifications and other embodiments of the inventions set forth herein will come to mind to one skilled in the art to which these inventions pertain containing the benefit of the teachings presented in the foregoing descriptions and the associated drawings. Therefore, it is to be understood that the inventions are not to be limited to the specific examples of the embodiments disclosed and that modifications and other embodiments are intended to be included within the scope of the appended claims. Although specific terms are employed herein, they are used in a generic and descriptive sense only and not for purposes of limitation.

What is claimed is:

1. A system for verifying a contactless sensor tag, comprising a reading device, a sensor tag, and a verifying device, wherein:

the reading device generates a first verification code according to a first dynamic value and sends the first verification code to the sensor tag, and generates an authority request according to an authority code received from the sensor tag and sends the authority request to the verifying device;

the sensor tag obtains said first verification code from said reading device in a contactless way, generates a second verification code according to a second dynamic value, performs a ciphering operation on data including an identification code, said first verification code and said second verification code to generating said authority code, and sends said authority code to said reading device in said contactless way; and the verifying device receives said authority request from said reading device, performs a deciphering operation on said authority request to obtain said first dynamic value and said second dynamic value, performs a first comparing operation on said first dynamic value and a third dynamic value to generate a first difference value, performs a second comparing operation on said second dynamic value and a fourth dynamic value to generate a second difference value, and determines whether said reading device is real according to said first difference value and determines whether said sensor tag is real according to said second difference value, wherein said deciphering operation corresponds to said ciphering operation.

2. The system for verifying a contactless sensor tag of claim 1, wherein said reading device includes a first dynamic value generator which generates said first dynamic value according to a first operator mode, and a first verification code generator which generates said first verification code according to a first cipher mode; said sensor tag includes a second dynamic value generator which generates said second dynamic value according to a second operator mode, and a second verification code generator which generates said second verification code according to a second cipher mode; and said verifying device includes a third dynamic value generator which generates said third dynamic value according to said first operator mode, and a fourth dynamic value generator which generates said fourth dynamic value according to said second operator mode.

3. The system for verifying a contactless sensor tag of claim 2, wherein said first operator mode and said second operator mode are selected from a group consisting of a time stamp mode, a counting mode and an authentication password mode.

4. The system for verifying a contactless sensor tag of claim 2, wherein said first cipher mode and said second cipher mode are selected from a group consisting of a predetermined formula mode and a table checking mode.

5. The system for verifying a contactless sensor tag of claim 1, wherein said ciphering operation utilizes said identification code, said first verification code and said second verification code as ciphering source operands, and a content of a ciphering destination operand includes said authority code; and said deciphering operation utilizes said authority code as a deciphering source operand, and a content of a deciphering destination operand includes said identification code, said first verification code and said second verification code.

6. The system for verifying a contactless sensor tag of claim 1, wherein said contactless way is radio frequency (RF) communication.

7. A method for verifying a contactless sensor tag, including the steps of:
using a reading device to generate a first verification code according to a first dynamic value and to generate an authority request according to an authority code;
employing a sensor tag to receive said first verification code from said reading device in a contactless way, and serving said sensor tag to generate a second verification code according to a second dynamic value, performing a ciphering operation on data including an identification code, said first verification code and said second verification code to generate said authority code, and send said authority code to said reading device in a contactless way;
using a verifying device for receiving said authority request of said reading device, and performing a deciphering operation on said authority request to obtain said first dynamic value and said second dynamic value, performing a first comparing operation on said first dynamic value and a third dynamic value to generate a first difference value, performing a second comparing operation on said second dynamic value and a fourth dynamic value to generate a second difference value, and determining whether said reading device is verified according to said first difference value and determining whether said sensor tag is verified according to said second difference value, wherein said deciphering operation corresponds to said ciphering operation; and
said verifying device authenticating said identification code being real or fake through determining whether verifying the authenticity of said reading device and said sensor tag.

8. The method for verifying a contactless sensor tag of claim 7, wherein said reading device includes a first dynamic value generator which generates said first dynamic value according to a first operator mode, and a first verification code generator which generates said first verification code according to a first cipher mode; said sensor tag includes a second dynamic value generator which generates said second dynamic value according to a second operator mode, and a second verification code generator which generates said second verification code according to a second cipher mode; and said verifying device includes a third dynamic value generator which generates said third dynamic value according to said first operator mode, and a fourth dynamic value generator which generates said fourth dynamic value according to said second operator mode.

9. The method for verifying the contactless sensor tag of claim 8, wherein said first operator mode and said second operator mode are selected from a group consisting of a time stamp mode, a counting mode and an authentication password mode.

10. The method for verifying the contactless sensor tag of claim 8, wherein said first cipher mode and said second cipher mode are selected from a group consisting of a predetermined formula mode and a table checking mode.

11. The method for verifying the contactless sensor tag in of claim 7, wherein said ciphering operation utilizes said identification code, said first verification code and said second verification code as ciphering source operands, and a content of a ciphering destination operand includes said authority code; and said deciphering operation utilizes said authority code as a deciphering source operand, and a content of a deciphering destination operand includes said identification code, said first verification code and said second verification code.

12. The method for verifying the contactless sensor tag of claim 7, wherein said contactless way is radio frequency (RF) communication.

* * * * *